United States Patent
Hsieh et al.

(10) Patent No.: US 7,308,137 B2
(45) Date of Patent: Dec. 11, 2007

(54) METHOD OF DETERMINING COLOR COMPOSITION OF AN IMAGE

(75) Inventors: Wen-Hsuan Hsieh, I-Lan Hsien (TW); Chia-Hao Shih, Chang-Hua Hsien (TW); I-Chen Teng, Taipei Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 679 days.

(21) Appl. No.: 10/709,943

(22) Filed: Jun. 8, 2004

(65) Prior Publication Data

US 2005/0271270 A1    Dec. 8, 2005

(51) Int. Cl.
*G06K 9/00*    (2006.01)

(52) U.S. Cl. .............. 382/170; 382/162; 382/165; 382/168

(58) Field of Classification Search ........ 382/168–172; 358/464

See application file for complete search history.

(56) References Cited

U.S. PATENT DOCUMENTS

| | | | |
|---|---|---|---|
| 5,177,603 A * | 1/1993 | Kojima | 358/518 |
| 5,225,927 A | 7/1993 | Nozaki et al. | |
| 5,376,984 A | 12/1994 | Abe | |
| 5,786,906 A * | 7/1998 | Shishizuka | 358/500 |
| 6,005,680 A * | 12/1999 | Luther et al. | 358/2.1 |
| 6,118,552 A * | 9/2000 | Suzuki et al. | 382/166 |
| 6,192,149 B1 * | 2/2001 | Eschbach et al. | 382/168 |
| 6,240,203 B1 * | 5/2001 | Kawano et al. | 382/164 |
| 6,288,797 B1 | 9/2001 | Ueno | |
| 6,377,703 B1 * | 4/2002 | Yeung | 382/173 |
| 6,404,997 B1 | 6/2002 | Grace | |
| 6,414,292 B1 | 7/2002 | Afghahi | |
| 7,072,506 B1 * | 7/2006 | Hirota et al. | 382/162 |
| 7,177,462 B2 * | 2/2007 | Hirota et al. | 382/162 |
| 2005/0163374 A1 * | 7/2005 | Ferman et al. | 382/176 |
| 2005/0276471 A1 * | 12/2005 | Shin et al. | 382/162 |

* cited by examiner

*Primary Examiner*—Samir Ahmed
*Assistant Examiner*—Eric Rush
(74) *Attorney, Agent, or Firm*—Winston Hsu

(57) ABSTRACT

A method of determining color composition of an image includes calculating an intensity value and a saturation value for each pixel of the image, comparing the calculated intensity and saturation values for each pixel with first and second predetermined threshold values, respectively, and labeling pixels with calculated intensity values above the first predetermined threshold value and calculated saturation values above the second predetermined threshold value as color pixels. Next, a mask is applied to the image and the number of color pixels selected by the mask is counted. If the number of color pixels selected by the mask is greater than or equal to a predetermined density value, the image is determined to be a color image.

8 Claims, 6 Drawing Sheets

| 0 | 1 | 1 | 0 | 1 | 0 | 1 | 1 | 0 | 1 |
|---|---|---|---|---|---|---|---|---|---|
| 0 | 1 | 1 | 1 | 0 | 1 | 0 | 1 | 0 | 0 |
| 1 | 1 | 0 | 0 | 1 | 1 | 0 | 0 | 1 | 1 |
| 1 | 0 | 0 | 0 | 1 | 1 | 1 | 0 | 1 | 1 |
| 0 | 0 | 1 | 1 | 0 | 0 | 1 | 1 | 0 | 1 |
| 1 | 1 | 1 | 1 | 0 | 0 | 0 | 1 | 1 | 0 |
| 0 | 1 | 0 | 0 | 1 | 1 | 0 | 1 | 1 | 0 |
| 1 | 0 | 1 | 0 | 0 | 1 | 1 | 0 | 0 | 1 |
| 0 | 1 | 1 | 0 | 0 | 1 | 0 | 0 | 0 | 1 |
| 1 | 1 | 1 | 0 | 0 | 1 | 1 | 1 | 0 | 0 |

Fig. 2 Prior Art

METHOD OF DETERMINING COLOR COMPOSITION OF AN IMAGE

BACKGROUND OF INVENTION

1. Field of the Invention

The present invention relates to image processing, and more specifically, to a method determining if an image is a color image, a black and white image, or a gray image.

2. Description of the Prior Art

When acquiring digital images such as by using a scanner or a digital still camera, it is important to know what type of image has been acquired. Image types can be classified according to the color composition of the image. For example, three main types of images are color images, black and white images, and gray images. Since the color composition of an image should be determined before image processing is performed, it is important to quickly and efficiently determine the color composition of images.

Please refer to FIG. 1. FIG. 1 is a flowchart illustrating a method for determining color composition of an image according to the prior art. The method starts with step 10. In step 12, intensity and saturation values are calculated for each pixel in the image. The intensity and saturation values are used to determine if the corresponding pixels are color pixels or not. The prior art method utilizes a lookup table stored in memory to store intensity values, corresponding saturation values, and information stating whether the pixel is a color pixel or not. In step 14, the intensity and saturation values for each pixel in the image are compared with data stored in the lookup table, and each pixel in the image is categorized as being a color pixel or not a color pixel.

In step 16, color density analysis is performed on masks of nearby pixels. Please refer to FIG. 2. FIG. 2 illustrates using a mask 44 to perform color density detection. Array 40 contains binary information indicating whether each pixel 42 in the image is a color pixel or not. For example, in FIG. 2 the binary value of "1" indicates that the corresponding pixel 42 is a color pixel. The mask 44 can be of any size, but is shown in FIG. 2 as a 3×3 mask, meaning that the mask 44 has dimensions of three pixels by three pixels. The mask 44 is applied to various different groups of pixels in the array 40 to determine the density of color pixels in the mask 44. Each time the mask 44 is applied, the number of pixels 42 contained by the mask 44 is counted. In step 18, this color pixel count is compared to a predetermined density value. If the color pixel count exceeds the predetermined density value, the image is labeled as a color image in step 20, thereby ending the process of determining the color composition of the image. On the other hand, if the color pixel count does not exceed the predetermined density value for any group of nearby pixels in the image, the method proceeds to step 22.

After deciding that the image is not a color image, the prior art method then determines whether the image is a black and white image or a gray image. To accomplish this, a histogram is calculated using the intensity values of all pixels of the image in step 22. Please refer to FIG. 3. FIG. 3 is a histogram 50 showing the number of pixels of the image having a particular intensity level. As an example, assume that the intensity levels of each of the pixels can range from 0 to 1, inclusively. These intensity levels can be divided into a smaller number of discrete levels. As shown in FIG. 3, the histogram 50 is divided into 15 intensity levels, labeled L1-L15. The histogram 50 contains vertical bars corresponding to the intensity levels L1-L15, and the height of the bars represent the number of pixels having intensity values within the various intensity levels. After the histogram 50 is calculated, the histogram 50 is analyzed for patterns that indicate either a black and white image or a gray image.

In step 24, the prior art method determines whether the histogram 50 indicates that a large percentage of pixels are concentrated in one of the intensity levels. If, for instance more than 80% of the pixels all fall into the same intensity level, the image is labeled as a black and white image in step 30, thereby ending the process of determining the color composition of the image. If this is not the case, the histogram 50 is analyzed in step 26 to see if the pixels are substantially arranged in two opposing extremes. If so, the two extremes represent black pixels and white pixels, and the image is labeled as a black and white image in step 30.

If neither of the conditions in steps 24 and 26 are satisfied, the histogram 50 is analyzed in step 28 to determine if the intensity of the pixels indicate that there is a large percentage of gray pixels. If the number of gray pixels is greater than a predetermined value, the image is labeled as a gray image in step 32 and the process is ended. Conversely, if the number of gray pixels is not greater than the predetermined value, the image is labeled as a black and white image in step 30 and the process is ended.

Although the prior art method is able to determine whether an image is color, black and white, or gray, the use of a lookup table in step 14 for comparing with the intensity and saturation values of each pixel in the image consumes many resources. First of all, memory is required for storing the lookup table. The lookup table could consume a considerable amount of memory depending on the amount of data used in the lookup table. Second, the prior art method searches the lookup table to compare the intensity and saturation values of each pixel with the values stored in the lookup table. Repeatedly searching and comparing for all of the pixels in the image requires a large amount of both processing power and time. For these reasons, a simplified method of determining the color composition of an image is needed.

SUMMARY OF INVENTION

It is therefore an objective of the claimed invention to introduce a method of determining color composition of an image in order to solve the above-mentioned problems.

According to the claimed invention, a method of determining color composition of an image includes calculating an intensity value and a saturation value for each pixel of the image, comparing the calculated intensity and saturation values for each pixel with first and second predetermined threshold values, respectively, and labeling pixels with calculated intensity values above the first predetermined threshold value and calculated saturation values above the second predetermined threshold value as color pixels. Next, a mask is applied to the image and the number of color pixels selected by the mask is counted. If the number of color pixels selected by the mask is greater than or equal to a predetermined density value, the image is determined to be a color image.

It is an advantage of the claimed invention that the color composition of the image can be calculated efficiently without the use of a lookup table to compare with the intensity and saturation values of each pixel in the image. Each of the intensity and saturation values can be compared to two predetermined threshold values for instantly evaluating whether a pixel is a color pixel or not.

These and other objectives of the claimed invention will no doubt become obvious to those of ordinary skill in the art after reading the following detailed description of the preferred embodiment, which is illustrated in the various figures and drawings.

BRIEF DESCRIPTION OF DRAWINGS

FIG. 2 illustrates using a mask to perform color density detection.

DETAILED DESCRIPTION

Figure 1:
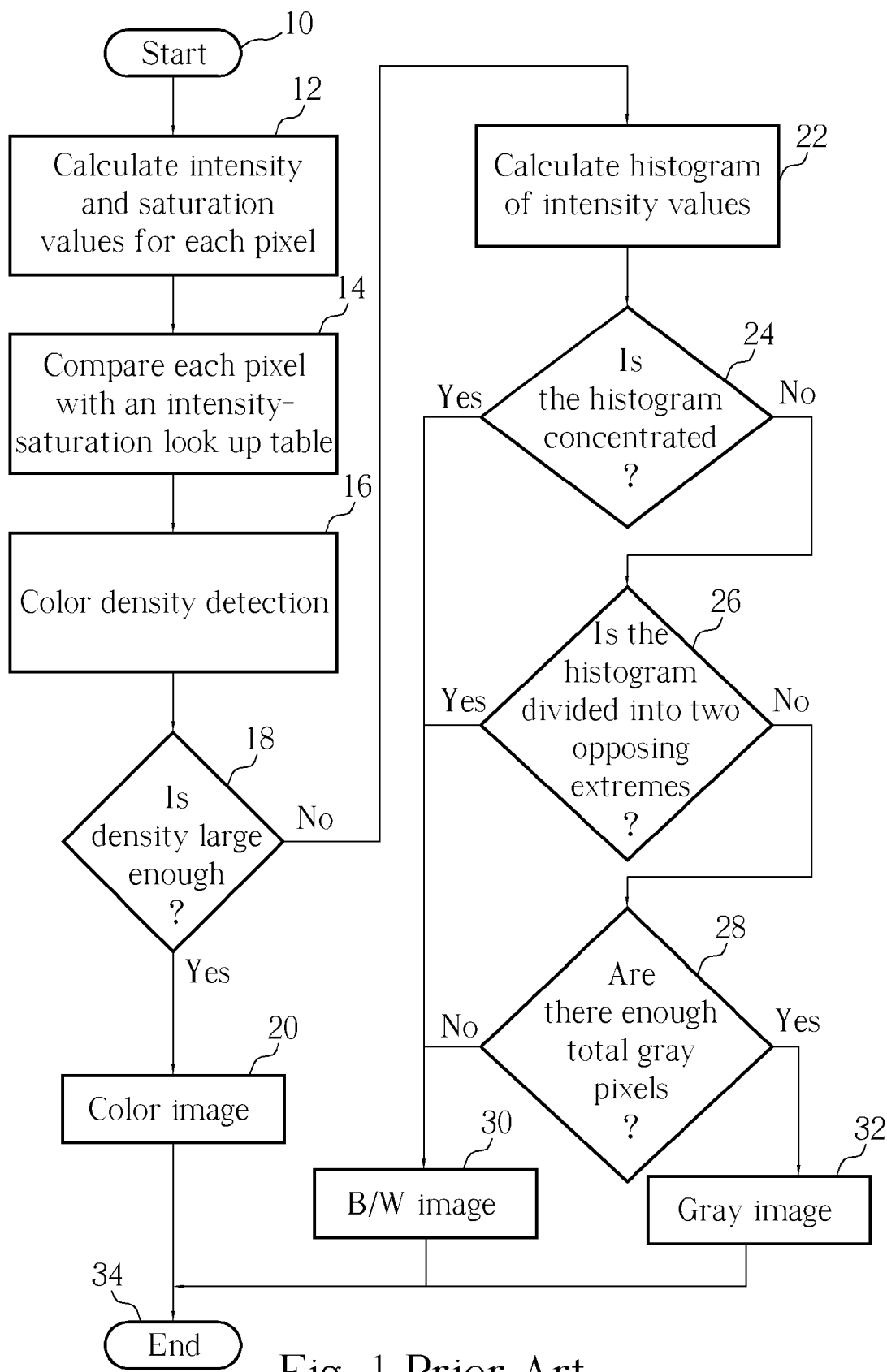
FIG. 1 is a flowchart illustrating a method for determining color composition of an image according to the prior art.
Figure 3:
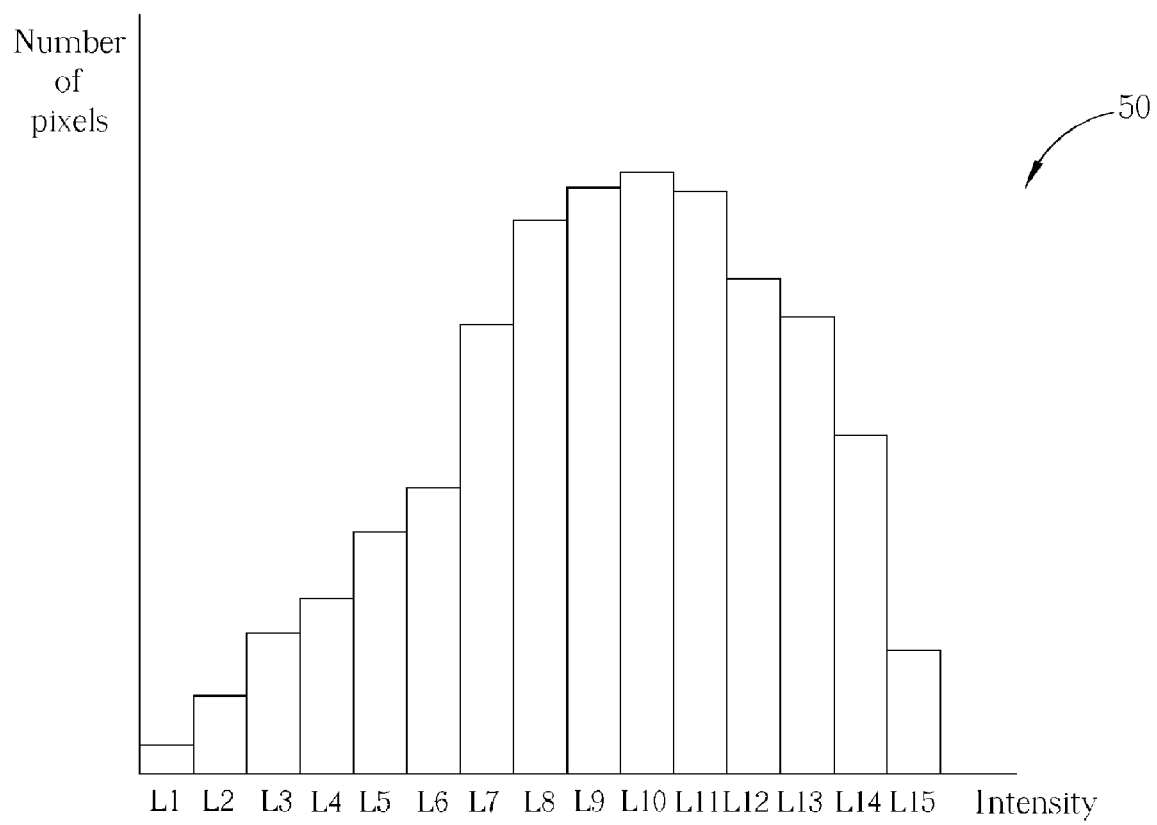
FIG. 3 is a histogram showing the number of pixels of the image having a particular intensity level.
Figure 4:
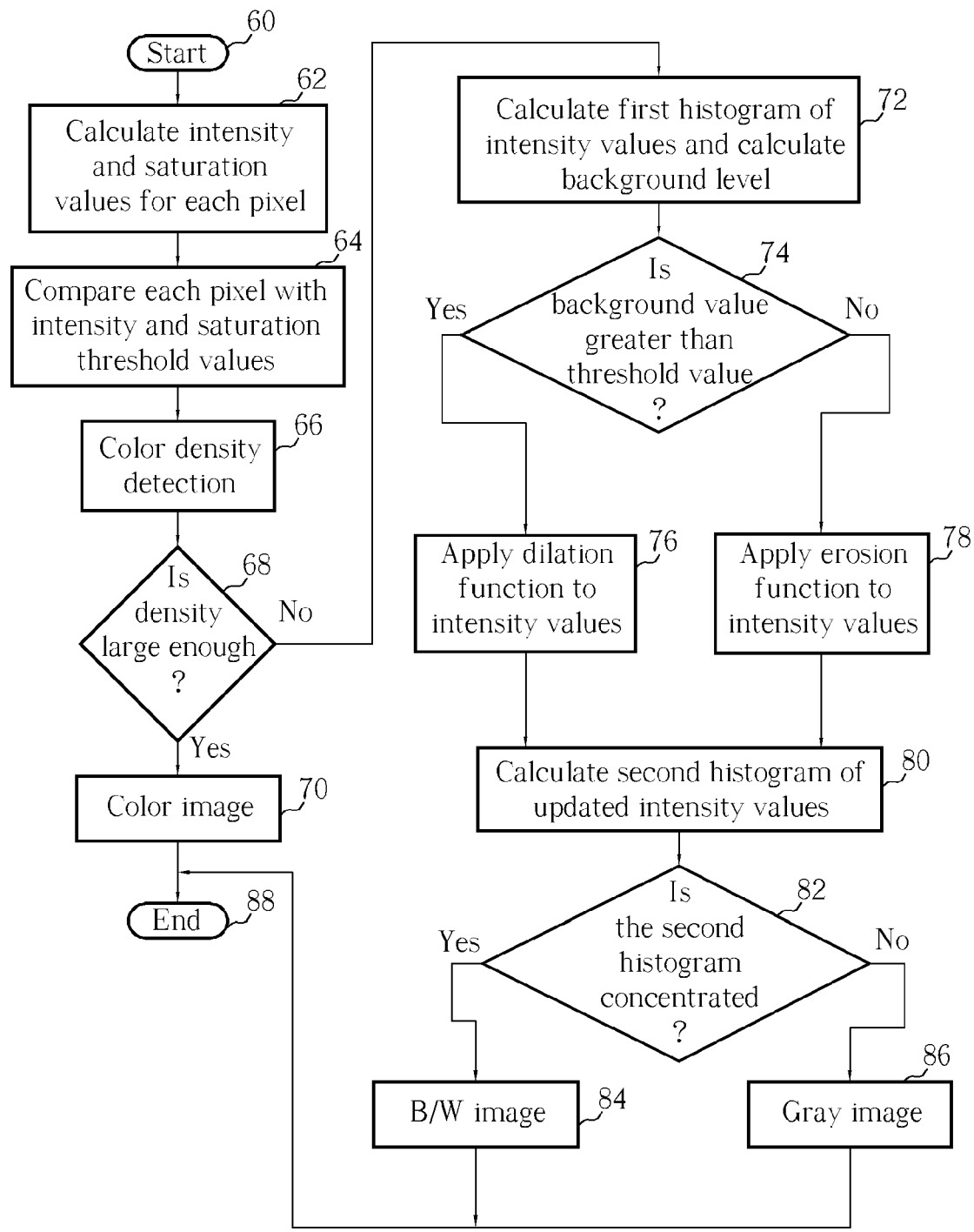
FIG. 4 is a flowchart illustrating a method for determining color composition of an image according to the present invention.

Please refer to FIG. 4. FIG. 4 is a flowchart illustrating a method for determining color composition of an image according to the present invention. The method starts with step 60. In step 62, intensity and saturation values are calculated for each pixel in the image. The present invention preferably uses the following equations for calculating the intensity and saturation of the pixels:

$$I = (R+G+B)/3 \qquad \text{(Eqn. 1)}$$

$$S = 1 - \text{Min}(R, G, B)/I \qquad \text{(Eqn. 2)}$$

where I represents intensity value, R, G, and B respectively represent red, green, and blue color levels, S represents the saturation value, and Min(R, G, B) selects the minimum color level among the R, G, and B color levels. For Eqn. 1 and Eqn. 2, R, G, and B have values between 0 and 1, inclusively.

In step 64, the intensity and saturation values for each pixel are respectively compared with first and second predetermined threshold values to determine if the pixels are color pixels or not. As an example, the preferred first and second threshold values of the present invention are 50/255 and 40/255, respectively. If the intensity of a pixel is greater than the first threshold value and the saturation of the pixel is greater than the second threshold value, then the pixel is determined to be a color pixel. If one or neither of these conditions is satisfied, then the pixel is determined to not be a color pixel.

In step 66, color density analysis is performed on masks of nearby pixels. Please refer back to FIG. 2 for an illustration of using the mask 44 to perform color density detection. As was done with the prior art, each pixel is classified as being a color pixel (1) or not a color pixel (0). The array 40 contains binary information indicating whether each pixel 42 in the image is a color pixel or not. The mask 44 is applied to each area in the array 40 to determine if any part of the array 40 contains a large enough color density. The size of the mask 44 in the preferred embodiment of the present invention is 3×3 pixels, but may be other sizes as well. Each time the mask 44 is applied, the number of pixels 42 contained by the mask 44 is counted. In step 68, this color pixel count is compared to a predetermined density value. In the preferred embodiment of the present invention, the predetermined density value is 7 pixels, assuming a 3×3 mask is used. If the color pixel count is greater than or equal to the predetermined density value for any instance that the mask 44 is applied, the image is labeled as a color image in step 70, thereby ending the process of determining the color composition of the image. On the other hand, if the color pixel count is less than the predetermined density value for all instances that the mask 44 is applied, the method proceeds to step 72.

Figure 5:
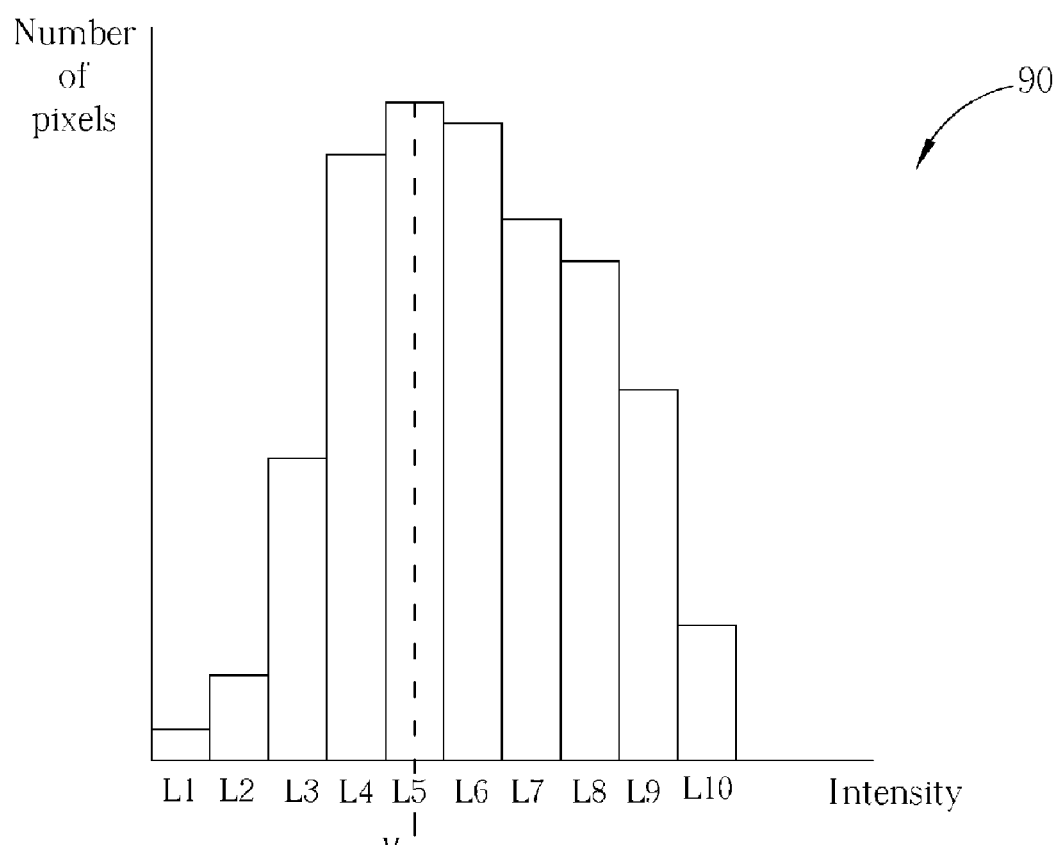
FIG. 5 is a histogram showing the number of pixels of the image having a particular intensity level.

After deciding that the image is not a color image, the present invention method then determines whether the image is a black and white image or a gray image. To accomplish this, a histogram is calculated using the intensity values of all pixels of the image in step 72. Please refer to FIG. 5. FIG. 5 is a histogram 90 showing the number of pixels of the image having a particular intensity level. As stated above, the intensity levels of each of the pixels can range from 0 to 1, inclusively. These intensity levels can be divided into a smaller number of discrete levels. As shown in FIG. 5, the histogram 90 is divided into ten intensity levels, labeled L1-L10. The histogram 90 contains vertical bars corresponding to the intensity levels L1-L10, and the height of the bars represent the number of pixels having intensity values within the various intensity levels. After the histogram 90 is calculated, the intensity level having the greatest number of pixels is selected. The median value of this selected intensity level is then set to be a background value $V_{Back}$ of the image. The background value $V_{Back}$ of the image represents the most predominant intensity level of the image, and can be used as a simple way of representing the background color of the image.

In step 74, the background value $V_{Back}$ is compared with a third predetermined threshold value. If the background value $V_{Back}$ is greater than the third threshold value, a dilation function is performed on the image in step 76. If the background value $V_{Back}$ is less than or equal to the background value $V_{Back}$, an erosion function is performed on the image in step 78. When performing the dilation function in step 76, a window is applied to each pixel in the image, and the intensity of the center pixel of the window is adjusted. The window preferably has dimensions of 3×3 pixels, but can also be other sizes as well. The intensity value of the center pixel of the window is replaced according to Eqn. 3 below:

$$I' = \text{Max}(W(p)) \qquad \text{(Eqn. 3)}$$

where I' represents the updated intensity of the center pixel, W(p) represents pixels included in the window around the center pixel, and Max(W(p)) represents the maximum intensity value of the pixels included in the window.

On the other hand, when performing the erosion function in step 78, the window is also applied to each pixel in the image, and the intensity of the center pixel of the window is adjusted. The intensity value of the center pixel of the window is replaced according to Eqn. 4 below:

$$I' = \text{Min}(W(p)) \qquad \text{(Eqn. 4)}$$

where Min(W(p)) represents the minimum intensity value of the pixels included in the window.

Figure 6:
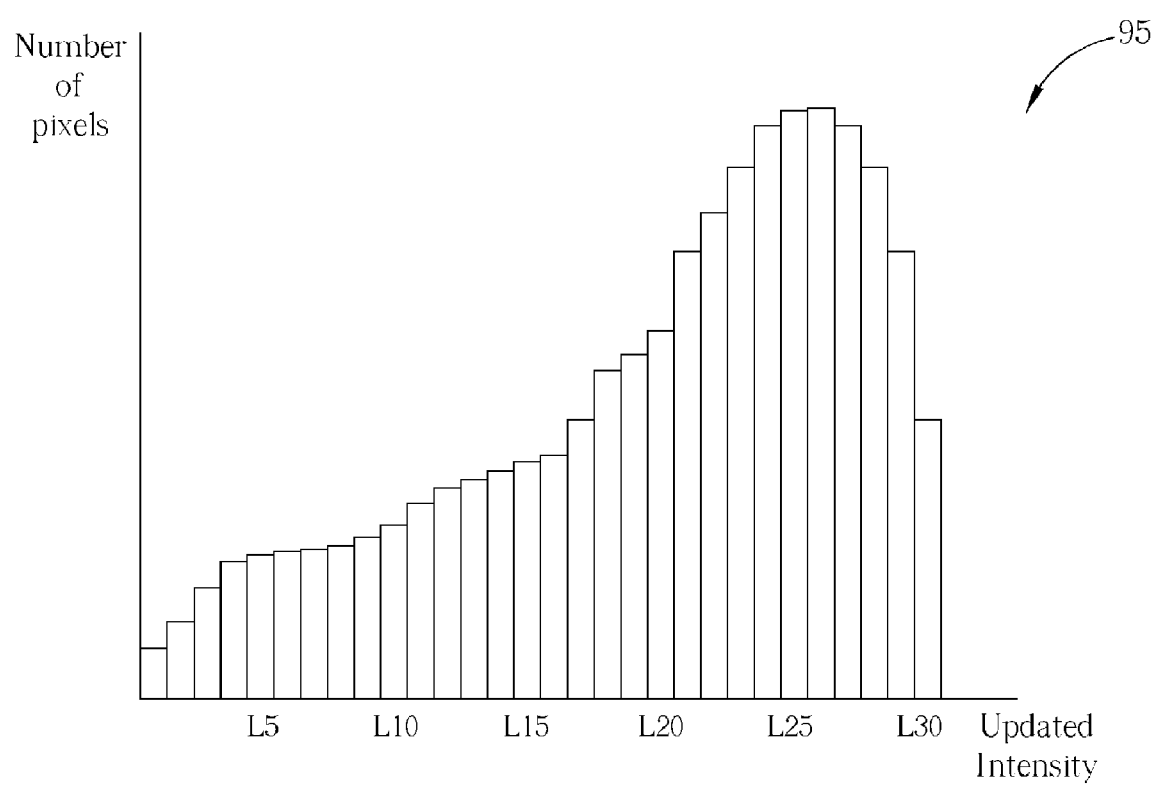
FIG. 6 is a histogram showing the number of pixels of the image having a particular updated intensity level.

After the dilation function or erosion function has been applied in either step 76 or step 78, the method proceeds to step 80. In step 80, the updated intensity values are used to create a second histogram. Please refer to FIG. 6. FIG. 6 is a histogram 95 showing the number of pixels of the image having a particular updated intensity level. Unlike before, the histogram 95 is divided into 30 intensity levels L1-L30.

The present invention method uses the histogram 95 to determine if the image being analyzed is a black and white image or a gray image. If the image is a black and white image, the dilation or erosion functions concentrates the updated intensity values of the pixels into one specific intensity level. In step 82, the method determines if one of the intensity levels L1-L30 contains a percentage of all of the pixels greater than a fourth predetermined threshold value. The fourth threshold value is preferably 90%, but can also be greater or less than 90%. If any of the intensity levels L1-L30 contains a percentage of pixels greater than the fourth threshold value, the image is labeled as a black and white image in step 84. On the other hand, if none of the intensity levels L1-L30 contains a percentage of pixels greater than the fourth threshold value, the image is labeled as a gray image in step 86, thereby ending the process of determining the color composition of the image.

In contrast to the prior art, the present invention method of determining color composition of an image can be calculated efficiently without the use of a lookup table to compare with the intensity and saturation values of each pixel in the image. Each of the intensity and saturation values can be compared to two predetermined threshold values for instantly evaluating whether a pixel is a color pixel or not. Furthermore, use of the dilation and erosion functions help to distinguish black and white images from gray images by updating the intensity values of pixels.

Those skilled in the art will readily appreciate that numerous modifications and alterations of the device may be made without departing from the scope of the present invention. Accordingly, the above disclosure should be construed as limited only by the metes and bounds of the appended claims.

What is claimed is:

1. A method of determining color composition of an image, the method comprising:
    calculating an intensity value and a saturation value for each pixel of the image, wherein the intensity value of each pixel is calculated by the formula $I=(R+G+B)/3$, where I represents intensity value, R, G and B respectively represent red, green, and blue color levels, and the saturation value of each pixel is calculated by the formula $S=1-Min(R, G, B)/I$, where S represents the saturation value and Min(R, G, B) selects the minimum color level among the R, G, and B color levels;
    comparing the calculated intensity and saturation values for each pixel with first and second predetermined threshold values, respectively;
    labeling pixels with calculated intensity values above the first predetermined threshold value and calculated saturation values above the second predetermined threshold value as color pixels;
    applying a mask to the image and counting the number of color pixels out of the pixels selected by the mask; and
    determining that the image is a color image if the number of color pixels selected by the mask is greater than or equal to a predetermined density value.

2. The method of claim 1 wherein the mask has dimensions of three pixels by three pixels.

3. The method of claim 1 wherein the predetermined density value is equal to seven pixels.

4. A method of determining color composition of an image, the method comprising:
    calculating an intensity value and a saturation value for each pixel of the image;
    comparing the calculated intensity and saturation values for each pixel with first and second predetermined threshold values, respectively;
    labeling pixels with calculated intensity values above the first predetermined threshold value and calculated saturation values above the second predetermined threshold value as color pixels;
    applying a mask to the image and counting the number of color pixels out of the pixels selected by the mask;
    determining that the image is a color image if the number of color pixels selected by the mask is greater than or equal to a predetermined density value; and
    after determining that the image is not a color image, the method further comprises:
        calculating a first histogram of the intensity values of all of the pixels in the image, the first histogram being divided into a first predetermined number of intensity ranges;
        choosing an intensity range in the first histogram containing the greatest number of pixels;
        setting a median value of the chosen intensity range as a background value for the image;
        updating the intensity values of the pixels in the image by performing a dilation function if the background value is greater than a third predetermined threshold value or performing an erosion function if the background value is less than or equal to the third predetermined threshold value;
        calculating a second histogram of the updated intensity values of all of the pixels in the image, the second histogram being divided into a second predetermined number of intensity ranges; and
        determining that the image is a black and white image if any one of the intensity ranges in the second histogram contains a number of pixels equal to or greater than a fourth predetermined threshold value, or determining that the image is a gray image otherwise.

5. The method of claim 4 wherein when performing the dilation function, a window is applied to each pixel in the image and the intensity value of a center pixel of the window is replaced according to the equation $I'=Max(W(p))$, where I' represents the updated intensity of the center pixel, W(p) represents pixels included in the window around the center pixel, and Max(W(p)) represents the maximum intensity value of the pixels included in the window.

6. The method of claim 5 wherein the window has dimensions of three pixels by three pixels.

7. The method of claim 4 wherein when performing the erosion function, a window is applied to each pixel in the image and the intensity value of a center pixel of the window is replaced according to the equation $I'=Min(W(p))$, where I' represents the updated intensity of the center pixel, W(p) represents pixels included in the window around the center pixel, and Min(W(p)) represents the minimum intensity value of the pixels included in the window.

8. The method of claim 7 wherein the window has dimensions of three pixels by three pixels.

* * * * *